May 26, 1936.                B. McGUIRE                 2,042,350
                              DITCH GATE
                          Filed Nov. 5, 1934
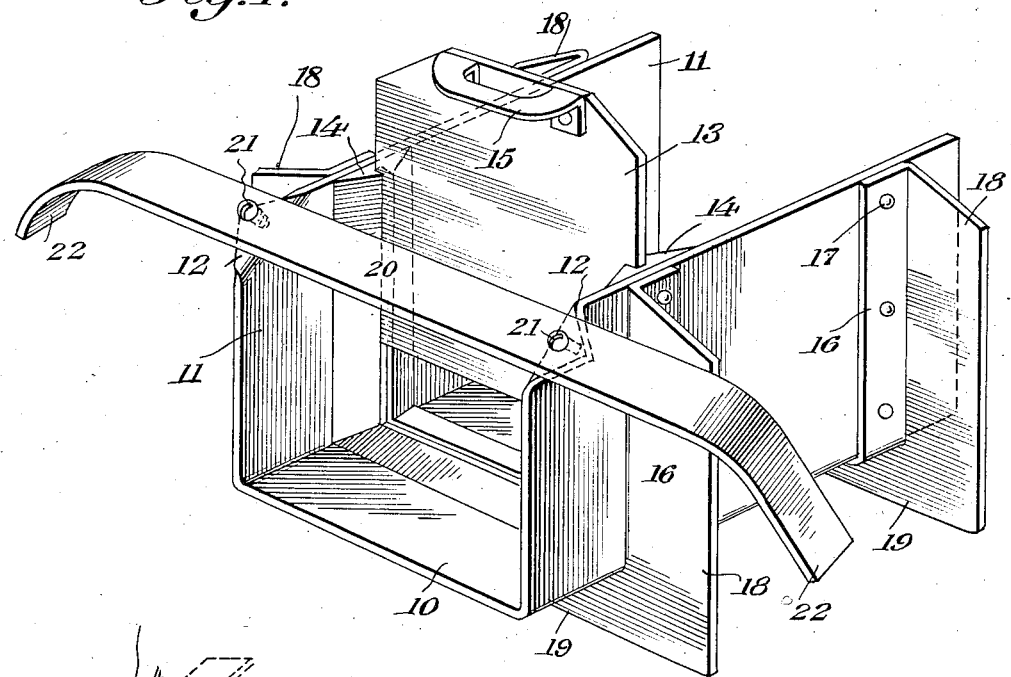
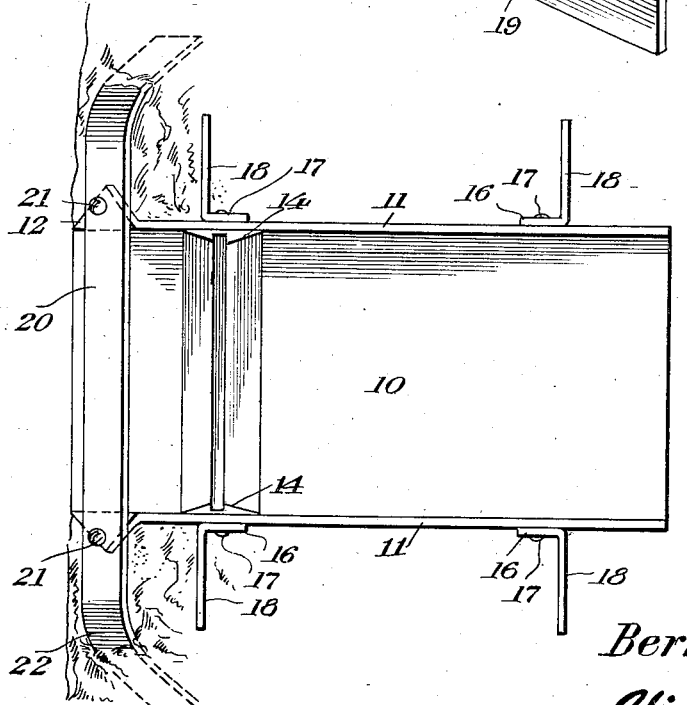
Bernard McGuire
INVENTOR
BY Victor J. Evans
and Co,  ATTORNEYS Patented May 26, 1936

2,042,350

UNITED STATES PATENT OFFICE 2,042,350

DITCH GATE

Bernard McGuire, Lansing, Iowa

Application November 5, 1934, Serial No. 751,646

2 Claims. (Cl. 61—28)

This invention relates to head gates for irrigating ditches and the like, and contemplates the provision of a simple and durable structure which can be effectively embedded in the ground, to immovably support the structure in a position for use, the gate proper being capable of being conveniently manipulated to control the flow of water through the ditch.

The nature and advantages of the invention will be better understood when the following detail description is read in connection with the accompanying drawing, the invention residing in the construction, combination and arrangement of parts as claimed.

In the drawing forming part of this application like numerals of reference indicate similar parts in the several views and wherein:

Figure 1 is a perspective view of the ditch or head gate which forms the subject matter of the present invention.

Figure 2 is a top plan view thereof, with the closure or gate removed.

The device forming the subject matter of the present invention embodies a box including a bottom 10 and spaced parallel side walls 11, the forward corners of which are bent outwardly as at 12 for a purpose to be hereinafter described. The box of course is adapted to be arranged in a ditch, a gate 13 being employed to control the flow of water through the ditch, and which gate is slidable vertically in grooves in guide members 14 secured to the opposed side walls 11 and bottom 10 of the box, the sides of the guide members being inclined from the grooves toward the box, as illustrated. For the purpose of manipulating the gate 13 the latter is provided with a handle 15 secured to and projecting laterally from the upper end portion of the gate.

For the purpose of immovably supporting the structure in the ditch, I make use of a pair of substantially U-shaped members 16 which extend across the bottom 10 and upwardly along the sides 11 of the box, being riveted or otherwise suitably secured thereto as at 17. Projecting from each U-shaped member 16 are flanges 18 which extend laterally from the sides 11 of the box, while the flange 19 forming part of each U-shaped member depends from the bottom of the box and is adapted to be embedded in the ground. To further assist in the support of the box I employ a flat bar 20 which is riveted or otherwise suitably secured as at 21 to the outturned corners 12 of the box, the ends of this bar 20 being curved outwardly and downwardly as at 22 to be embedded in the ground at points suitably spaced from the sides of the box as shown in Figure 2.

While it is believed that from the foregoing description, the nature and advantages of the invention will be readily apparent, I desire to have it understood, that I do not limit myself to what is herein shown and described, and that such changes may be resorted to when desired as fall within the scope of what is claimed.

What is claimed is:

1. A head gate apparatus comprising a box including a bottom and spaced parallel side walls, a substantially U-shaped guide arranged within the box and provided with grooves, the sides of the guides being inclined toward the box, a gate slidably mounted for vertical movement in the grooves, substantially U-shaped members secured to the bottom and sides of the box, flanges extending at right angles from the U-shaped members to project laterally from the sides and downwardly from the bottom and adapted to be embedded in the ground for fixing the head gate in position for use.

2. A head gate comprising a box including a bottom and opposed side walls, the latter having outturned corners at the upper forward ends thereof, a substantially U-shaped guide arranged within the box, a vertically slidable gate operating in said guides, U-shaped members secured to the bottom and sides of the box, flanges formed on and extending at right angles from each U-shaped member to project laterally from the sides of the box and downwardly from the bottom thereof, a flat bar bridging the sides and secured to the outturned corners thereof, said bar extending in a plane beyond the outer ends of the lateral flanges and terminating in rearwardly and downwardly curved portions to be embedded in the ground for cooperating with said flanges for fixing the head gate in position for use.

BERNARD McGUIRE.